United States Patent Office 2,873,196
Patented Feb. 10, 1959

2,873,196

RUST PREVENTATIVE AND ANTI-RUST STABILIZING COMPOSITIONS

Melvin M. Baevsky, Wilmington, Del., assignor to E. I. du Pont de Nemours and Company, Wilmington, Del., a corporation of Delaware No Drawing. Application April 16, 1956
Serial No. 578,178

9 Claims. (Cl. 106—14)

This invention relates to shellac and more particularly to alcohol shellac solutions to which has been added agents which inhibit or prevent the discoloration of the shellac solution by iron or steel containers in which the shellac is stored.

It is customary to sell shellac as a solution in which about 5 pounds of the pure gum is dissolved in one gallon of 95% denatured alcohol. This shellac solution is often packaged in metal containers since they are cheap and do not leak readily even when roughly handled. However, they have the disadvantage that a reaction takes place between the shellac and the iron of the container to form a colored reaction product which detracts from the appearance of the shellac.

Many expedients have been resorted to in attempts to overcome this discoloration, such as by coating the iron or steel container with a thin deposit of tin and similar non-reactive metal, but very often the coating is not perfect and electrolytic action sets up between the two dissimilar metals.

Other methods have been suggested to overcome the discoloration mentioned above, such as adding stabilizers to the alcoholic shellac solutions, the most common of which is oxalic acid. While this compound retards discoloration for considerable periods of time, it is relatively ineffective in preventing discoloration of shellac when stored for an extended period. From a study of the prior art, it appears that no successful chemical stabilizer is available at present for the specific purpose of preventing discoloration of alcoholic shellac solutions when stored in iron containers. In view of this fact, glass bottles are largely used, although these are subject to breakage and are far less satisfactory than metal containers would be if their adverse effect on the shellac could be overcome.

It is, therefore, an object of this invention to provide a stabilizer for inhibiting the discoloration of iron or steel. Another object is the provision of an alcoholic solution of the stabilizer which may be applied as a coating composition. A still further object is the provision of a stabilizer which may be added to or mixed with alcoholic solutions of shellac and similar coating compositions which are normally subject to discoloration by extended contact with iron. A still further object is the stabilization of other organic solutions, such as ethylene glycol and denatured alcohol anti-freeze preparations. Other objects will appear as the description of the invention proceeds.

These objects are accomplished by preparing an alcoholic solution of a mono- or di-aliphatic ester of orthophosphoric acid together with a small amount of a colorless inorganic ionizable reducing agent. These solutions may be added to an alcoholic shellac solution, ethylene glycol or ethyl alcohol anti-freeze solutions or may be applied directly to a metal as a coating composition. More specifically, the mono- and di-aliphatic esters of ortho-phosphoric acid are the long chain acid esters of ortho-phosphoric acid in which one or two of the three hydrogens of the acid are replaced by esterification with straight chain, normal alcohols having from 8 to 22 carbon atoms.

The reducing agents which have been found to be exceptionally effective are stannous chloride and sodium hypophosphite. The organic phosphates described above and the sodium hypophosphite or stannous chloride may be added to the shellac at any time. One convenient way is to dissolve them in ordinary 190 proof denatured alcohol. The stabilizers may be sold in this form to manufacturers of shellac for adding when it is cut in alcohol or may be sold generally as a coating composition or as a corrosion inhibitor for anti-freeze preparations. The alcoholic solution of stabilizers may have a wide range of concentration, but it is generally preferred to prepare solutions of 25 to 75% concentration of the active ingredients by weight. These solutions are then added in amounts sufficient to provide from 1.0 to 0.1% by weight of the alkyl phosphates, and from 0.01 to 0.001% of the reducing agent in the shellac or other solution as sold or applied. The amount of reducing agent in this range is from 0.1% to 10% of the amount of phosphoric ester.

The above represents one method of incorporating the stabilizer into the shellac, but it is also within the scope of this invention to add the stabilizer to the dry shellac before or at the time the shellac is dissolved in alcohol.

EXAMPLE I 5 pounds of commercial gum shellac was dissolved in one gallon of 190 proof denatured alcohol and strained. The shellac was stored at 100° F.±1° F. in 8-ounce petroleum bottles, together with uniform strips of clean, black iron. Sample #1 contained no stabilizer and sample #2 contained stabilizer as indicated in the table below. At the end of a month the solutions were shaken and compared with a solution of shellac in which no iron strip had been placed.

TABLE 1

| No. | Treatment | Conc., Wt. Percent | Appearance |
|---|---|---|---|
| 1 | None | | Dark, very discolored. |
| 2 | Mixture of mono- and di-alkyl phosphates. | 0.3 | Light, no discoloration. |
|  | Sodium hypophosphite | 0.005 | |

It will be noted from the above table that discoloration is greatly inhibited, if not eliminated, by the stabilizer.

EXAMPLE II

Since commercial shellac is often stabilized with oxalic acid, a test was made to determine whether or not the stabilizers of the present invention were effective in such shellac. The results of this experiment are as follows.

TABLE 2

| No. | Treatment | Conc., Wt. Percent | Appearance |
|---|---|---|---|
| 3 | None | | Dark, very discolored. |
| 4 | Oxalic Acid | 0.1 | Dark, discolored. |
| 5 | Alkyl phosphate mixture | 0.3 | Light, no discoloration. |
|  | Sodium hypophosphite | 0.005 | |
|  | Oxalic acid | 0.1 | |

It will be apparent from the above results that the stabilizer of the present invention does not have an adverse effect on shellac solutions to which oxalic acid has been added as a stabilizer.

EXAMPLE III

The following example illustrates the use of stannous chloride in place of the sodium hypophosphite of Example I. A 5-pound cut shellac was stored in petroleum bottles with strips of iron for one month as outlined in Example I. At that time, the samples were shaken and their appearance recorded below.

TABLE 3

| No. | Treatment | Conc., Wt. Percent | Appearance |
|---|---|---|---|
| 6 | None | | Dark, very discolored. |
| 7 | Alkyl phosphate mixture<br>Sodium hypophosphite | 0.3<br>0.005 | Light, no discoloration. |
| 8 | Alkyl phosphate mixture<br>Stannous chloride | 0.3<br>0.005 | Do. |

It will be noted from the above example that both stannous chloride and sodium hypophosphite are equally effective in eliminating or reducing the discoloration of the shellac due to contact with iron.

The above examples illustrate the invention in which mixtures of alkyl phosphates and sodium hypophosphite or stannous chloride are used in combination. In order to determine whether or not these ingredients may be used separately, solutions were made as indicated in the table below and were treated as in Examples I and II.

TABLE 4

| No. | Treatment | Conc., Wt. Percent | Appearance |
|---|---|---|---|
| 9 | None | | Dark, very discolored. |
| 10 | Stannous chloride | 0.5 | Do. |
| 11 | Sodium hypophosphite | 0.5 | Do. |
| 12 | Alkyl phosphate mixture | 0.3 | Dark, slightly discolored. |
| 13 | Alkyl phosphate mixture<br>Sodium hypophosphite | 0.3<br>0.005 | Light, no discoloration. |

It will be observed from the above that the alkyl phosphates must be used in combination with either stannous chloride or sodium hypophosphite or mixtures of the two in the preferred embodiment of the invention.

The alcoholic solutions of the stabilizers in the above examples illustrate their effectiveness in connection with alcoholic shellac solutions when stored in metal containers. These stabilizing solutions, however, have other uses. One such use is the application of the stabilizers to ferrous metal surfaces to protect them from rusting. Another is the addition of the stabilizer, preferably in the form of a solution, to anti-freeze preparations of the denatured alcohol or ethylene glycol type.

A preferred solution of this kind designated in the following examples as solution A is one composed of 49.5% of 190 proof denatured ethyl alcohol (formula SD-1), 50% of the alkyl phosphate mixture described above and 0.5% of sodium hypophosphite, or stannous chloride by weight. The percentages and ratios are illustrative only and may vary as described above in connection with the stabilization of the shellac solution with satisfactory results. The following examples illustrate embodiments of the invention in which the stabilizer is used as a coating compound and a corrosion inhibitor for anti-freeze preparations.

EXAMPLE IV

Coating compound

The inner surfaces of blackplate metal cans were coated with solution A and exposed to the atmosphere for six months. A sufficient amount of solution to insure complete wetting of the surfaces was placed in the can, which was then shaken for a few seconds, emptied and allowed to dry. Coatings of various thicknesses were obtained by varying the concentration of the solution.

TABLE 5

| No. | Treatment | Results |
|---|---|---|
| 14 | None | Heavily rusted. |
| 15 | Solution A diluted with 9 parts of alcohol. | Clean, no rust. |
| 16 | Pure Solution A | Do. |

Uniform strips of steel (⅝" x 6"), were dipped into solution A, dried and exposed to the atmosphere. The following table summarizes the results after six months.

TABLE 6

| No. | Treatment | Results |
|---|---|---|
| 17 | None | Heavily rusted. |
| 18 | Solution A diluted with 9 parts of alcohol. | Clean, no rust. |
| 19 | Pure Solution A | Do. |

Sections of cast iron pipe were coated with solution A, dried, and immersed in 20% brine or 0.1% acetic acid solutions. The solutions were held at a temperature of 40° C. for 26 days. The metal samples were washed and removed and the remaining solutions were analyzed for iron. Corrosion rates were calculated as grams of iron lost per square centimeter of pipe surface per day.

TABLE 7

| No. | Treatment | Solution | gms. iron/cm.²/day |
|---|---|---|---|
| 20 | None | 0.1% acetic acid | $2,938 \times 10^{-6}$ |
| 21 | Solution A diluted with 9 parts of alcohol. | do | $1,291 \times 10^{-6}$ |
| 22 | Pure Solution A | do | $630 \times 10^{-6}$ |
| 23 | None | 20% brine | $156 \times 10^{-6}$ |
| 24 | Solution A diluted with 9 parts of alcohol. | do | $28 \times 10^{-6}$ |
| 25 | Pure Solution A | do | $21 \times 10^{-6}$ |

EXAMPLE V

Corrosion inhibitor for denatured ethyl alcohol

Solutions of 190 proof denatured ethyl alcohol, formula SD-1, were inhibited with solution A and stored at 100° F. in glass bottles containing strips of steel. The following results are based on a 3-month storage period.

TABLE 8

| No. | Treatment | Results |
|---|---|---|
| 26 | None | Solution discolored, strip pitted. |
| 27 | .05% alkyl phosphate mixture | Solution slightly discolored, strip pitted. |
| 28 | 0.1% Solution A | No discoloration, no pitting. |
| 29 | 1.0% NaH₂PO₂ | Solution discolored, strip pitted. |

Solutions as above were also stored in blackplate metal cans at 100° F. The results are also based on a 3-month storage period.

TABLE 9

| No. | Treatment | Results |
|---|---|---|
| 30 | None | Solution discolored, can greatly corroded. |
| 31 | 0.05% alkyl phosphate mixture | Solution discolored, can corroded. |
| 32 | 0.1% Solution A | No discoloration, no corrosion. |

*Corrosion inhibitor for anti-freeze ethylene glycol preparations*

Ethylene glycol preparations such as used for anti-freeze solutions, inhibited with Solution A, were stored for 1 month at 100° F. in glass bottles each containing clean steel, copper, solder and aluminum strips.

TABLE 10

| No. | Treatment | Results |
|---|---|---|
| 33 | Ethylene glycol containing 3% water. | Much discoloration, strips slightly corroded. |
| 34 | #33 plus 0.50% sodium mercaptobenzothiazole and 2.5% borax. | Formation of black precipitate on metal, sour odor. |
| 35 | #34 plus 0.25% Solution A. | Metal clean, no odor, very slight white precipitate. |

These solutions were also stored in tin plate containers. The results after 1 month of storage at 100° F. are given below.

TABLE 11

| No. | Treatment | Results |
|---|---|---|
| 36 | Ethylene glycol containing 3% water. | Discoloration, container etched. |
| 37 | #36 plus 0.5% sodium mercaptobenzothiazole and 2.5% borax. | Formation of black precipitate. |
| 38 | #37 plus 0.25% Solution A. | No precipitate, solution clear, no pitting or etching of can. |

It has also been found that the inhibitor combination illustrated in the examples is more effective than equal amounts of either ingredient used separately, and that 0.5% of the reducing agents used alone is without appreciable effect, but when used even in the amount of 0.005% in combination with the alkyl phosphate there is no discoloration.

The organic phosphates preferred in the present invention are the long chain acid esters of ortho-phosphoric acid in which the long chain acid esters of ortho-phosphoric acid in which the aliphatic chain is derived from normal aliphatic alcohols which may be saturated or unsaturated and which may have from 8 to 22 carbon atoms. The alcohols manufactured from coconut kernel oils and sperm oil are particularly preferred. Various mixtures of suitable aliphatic alcohols, in fractions having different carbon contents, are available from natural sources. One fraction derived from coconut kernel oil suitable for the preparation of the organic phosphates of this invention, contains primarily n-octyl and n-decyl alcohols; another suitable fraction derived from coconut kernel oil, known as "Lorol 5" alcohol, has an average molecular weight of about 200 and consists of approximately 3% n-decyl, 61% n-dodecyl, 23% n-tetradecyl, 11% n-hexadecyl, and 2% n-octadecyl alcohols. "Ocenol," a mixture of long chain saturated and unsaturated alcohols obtained from sperm oil, is also suitable for preparing the organic phosphates of this invention: "Ocenol P" is one such mixture and has an average molecular weight of about 250 and the following approximate composition:

| Normal alcohol | $C_{12}$ | $C_{14}$ | $C_{16}$ | $C_{18}$ | $C_{20}$ | $C_{22}$ |
|---|---|---|---|---|---|---|
| Percent Saturated | 5 | 8 | 20.5 | 4 | 11 | 1.5 |
| Percent Unsaturated | 2 | 4 | 15.5 | 25 | 2 | 1.5 |

The mono- and di-alkyl phosphates employed in Examples I–V are those prepared from alcohols derived from coconut kernel oils as described above. The mono- and di-aliphatic esters of ortho-phosphoric acid prepared from mixtures of long chain saturated and unsaturated alcohols of the "Ocenol" type may also be employed according to the method of this invention with substantially identical results being obtained as illustrated in the following example:

EXAMPLE VI

Example I was repeated except that 3 pounds of commercial gum shellac was dissolved in one gallon of 190 proof denatured alcohol and strained. The shellac was stored at 100° F., in 8-once petroleum bottles, together with uniform strips of clean, black iron. Sample #39 contained no stabilizer. Samples 40, 41 and 42 contained stabilizer as indicated in the table below. At the end of 3 weeks the solutions were shaken and compared with a solution of shellac in which no iron strip had been placed.

TABLE 12

| No. | Treatment | Conc., Wt. percent | Appearance |
|---|---|---|---|
| 39 | None | | Dark, very discolored. |
| 40 | Mixture of mono- and di-alkyl phosphates (alkyl=n-$C_8$ to n-$C_{12}$). | 0.3 | Slight discoloration. |
|  | Sodium hypophosphite | 0.005 | |
| 41 | Mixture of mono- and di-alkyl phosphates (alkyl=n-$C_8$ to n-$C_{18}$). | 0.3 | Very slight discoloration. |
|  | Sodium hypophosphite | 0.005 | |
| 42 | Mixture of mono- and di-alkyl and alkenyl phosphates (alkyl and alkenyl=n-$C_8$ to n-$C_{22}$). | 0.3 | Do. |
|  | Sodium hypophosphite | 0.005 | |

Primarily, for reasons of economy the above-described mixtures of normal aliphatic alcohols are preferred. However, individual members (components) of said mixtures may be employed for the preparation of acidic mono- and di-aliphatic esters of ortho-phosphoric acid. These esters prepared from individual normal aliphatic alcohols having from 8 to 22 carbon atoms may replace the mixtures employed in the examples to achieve substantially the same results.

The mono- and di-phosphoric acid ester of these alcohols may be made by any commercial process, such as, for example, reacting the alcohols with the acid in the presence of phosphorous pentoxide, giving the mono- and di-alcohol esters in about equi-molecular proportions.

The accelerated tests illustrated in the above examples are equivalent to storage for at least 3 or 4 months under ordinary conditions. In many cases shelf stability is extended for even longer periods of time, but these vary with the particular shellac and the temperature conditions under which the storage takes place.

Ordinary shellac is prepared by dissolving the gum in alcohol and usually ranges from 3 to 5 pound cut of gum per gallon of alcohol, which represents a 30% to 50% solution of shellac in alcohol by weight. Any commercial solution may be stabilized by the present invention. The amount of stabilizer may vary between 1.0% and 0.1%, but the preferred limits of the range are 1.0% to 0.3% of the acid phosphates. The reducing agent may vary between 0.01% and 0.001%, but preferably between 0.01% to 0.003% by weight, based on the shellac solution.

While the invention has been illustrated in connection with stabilizing shellac solutions, other natural gums such as the copals, dammar, Congo gum, kauri and similar high acid number resins may likewise be stabilized in the same manner as illustrated above in connection with shellac.

The present invention offers a simple, inexpensive and economical expedient for overcoming a problem which has confronted users of shellac for many years. The invention obviates the need for prompt use of shellac stored in iron containers and eliminates the need of plating such containers with critically short metals such as tin.

This application is a continuation-in-part of U. S. application Serial No. 265,213, now abandoned.

It is apparent that many widely different embodiments of this invention may be made without departing from the spirit and scope thereof, and therefore, it is not intended to be limited except as indicated in the appended claims.

I claim:

1. An alcoholic stabilizing composition for the prevention of rust formation the active ingredients of which consist essentially of (A) an aliphatic acid ester of ortho-phosphoric acid, the aliphatic radicals of which contain from 8 to 22 carbon atoms, said aliphatic radicals being taken from the group consisting of n-alkyl and n-alkenyl radicals of the corresponding aliphatic alcohol, and, (B) a reducing agent selected from the group consisting of sodium hypophosphite and stannous chloride, said reducing agent being present in the amount of .1% to 10% of the said acid ester of ortho-phosphoric acid.

2. The composition of claim 1 wherein the active ingredients (A) and (B) are present in an amount between 25% and 75% by weight of said alcoholic stabilizing composition.

3. The composition of claim 1 in which the aliphatic radicals of the acid ester are mixed n-alkyl radicals.

4. The composition of claim 1 in which the aliphatic radicals are n-octyl and n-decyl radicals.

5. The composition of claim 1 in which the aliphatic radicals are n-octyl to n-octadecyl radicals.

6. An alcoholic solution which is resistant to discoloration on contacting with iron which consists essentially of (A) an alcoholic solution of shellac, (B) an aliphatic acid ester of ortho-phosphoric acid, the aliphatic radicals of which contain from 8 to 22 carbon atoms, said aliphatic radicals being taken from the group consisting of n-alkyl and n-alkenyl radicals of the corresponding aliphatic alcohol and, (C) a reducing agent selected from the group consisting of sodium hypophosphite and stannous chloride, said reducing agent being present in the amount of 0.1% to 10% of said ester of ortho-phosphoric acid.

7. The solution of claim 6 in which the concentration range of the phosphate is between 1.0% and 0.1% by weight and the concentration range for the reducing agent is between 0.01% and 0.001% by weight.

8. The solution of claim 6 in which the concentration range of the phosphate is between 1.0% and 0.3% by weight and the concentration range for the reducing agent is between 0.01% and 0.03% by weight.

9. The solution of claim 6 in which the aliphatic radicals of the acid ester are mixed n-alkyl radicals.

References Cited in the file of this patent

UNITED STATES PATENTS

| | | |
|---|---|---|
| 2,452,321 | Kluge | Oct. 26, 1948 |
| 2,690,435 | Albert | Sept. 28, 1954 |

FOREIGN PATENTS

| | | |
|---|---|---|
| 590,852 | Great Britain | July 30, 1947 |